Dec. 27, 1938.  A. L. ARMENTROUT ET AL  2,141,370
CEMENTING PLUG
Filed Feb. 23, 1938   2 Sheets-Sheet 1
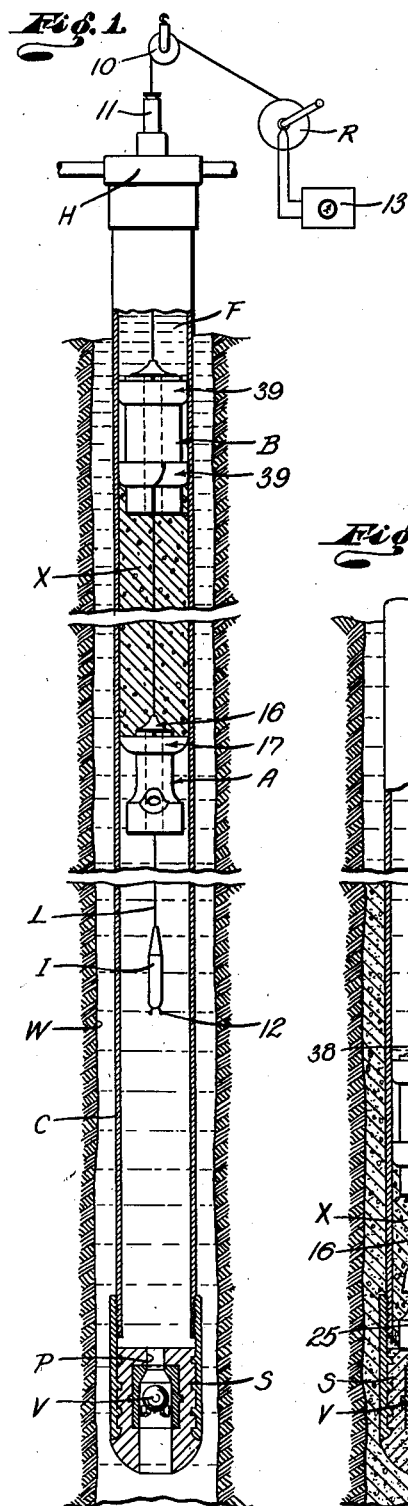
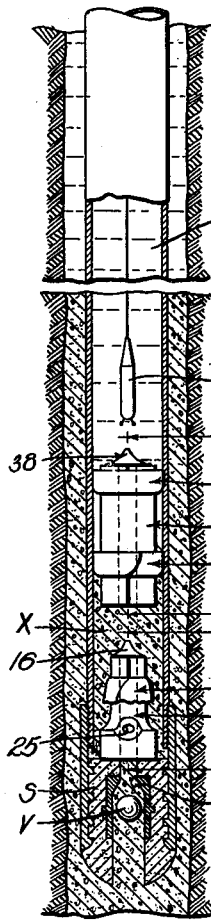
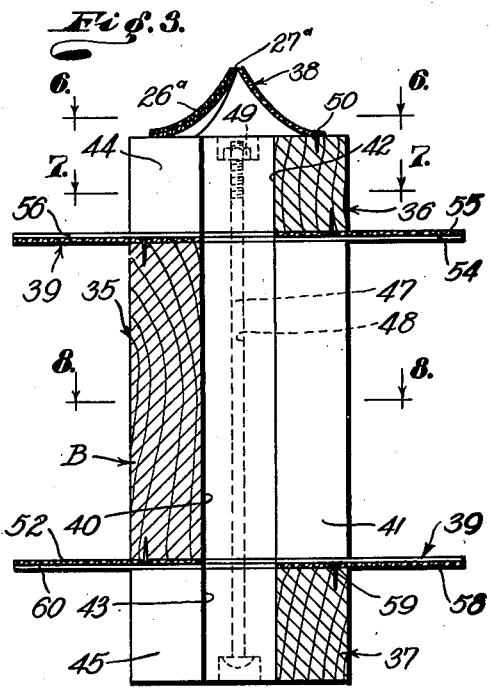
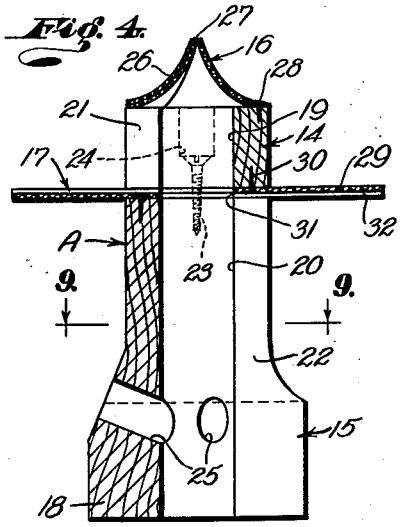
Inventors
ARTHUR L. ARMENTROUT
and RAY W. GUDIE
By
Their Attorney Dec. 27, 1938.   A. L. ARMENTROUT ET AL   2,141,370
CEMENTING PLUG
Filed Feb. 23, 1938   2 Sheets-Sheet 2
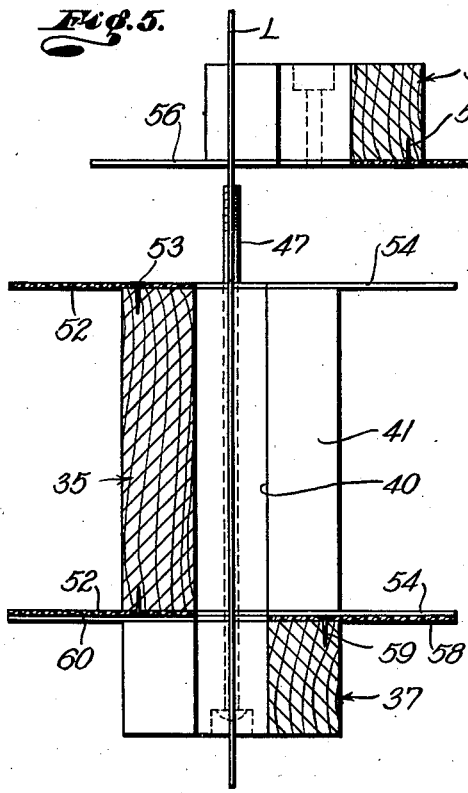
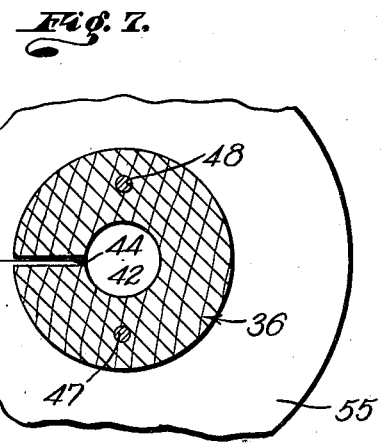
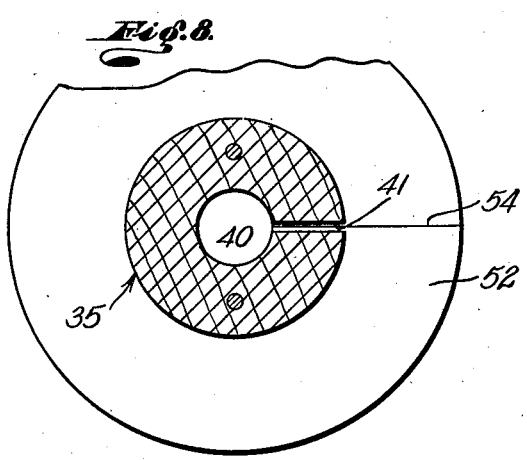
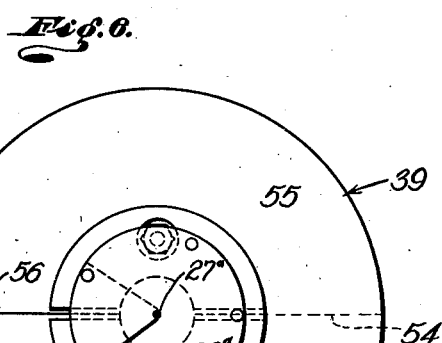
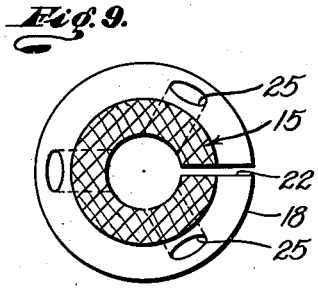
Inventors
ARTHUR L. ARMENTROUT
and
RAY W. GUDIE
By
Their Attorney Patented Dec. 27, 1938

2,141,370

UNITED STATES PATENT OFFICE 2,141,370

CEMENTING PLUG

Arthur L. Armentrout and Ray W. Gudie,
Los Angeles, Calif.

Application February 23, 1938, Serial No. 192,020

11 Claims. (Cl. 166—1)

This invention relates to apparatus useful in the cementing of casing, etc. in wells, and relates more particularly to cementing plugs.

In our co-pending application, Serial No. 170,862, filed October 25, 1937, we have described and claimed a method and apparatus for determining the position of the plastic cement or cement slurry in a well during the cementing of the casing in the well. In carrying out the said method an instrument or device sensitive to the electrical conductivity of the fluid in its field is run into the well on a wire line or cable and the cement is passed into the well whereby suitable indicating or recording instruments at the ground surface, read together with the metering reel handling the cable, indicate the depth or position of the cement when it influences the said instrument. As disclosed in the above mentioned co-pending application, the cement is passed or pumped in the well without the employment of cementing plugs, that is, the cement is pumped down through the well casing as a mass or strata with water or rotary mud at its upper and lower surfaces. In some instances it is necessary or desirable to employ cementing plugs at the upper and lower ends of the mass of cement being pumped down through the well casing to prevent loss of the plastic cement and to prevent contamination of the cement. The present invention is concerned with cementing plugs for use in such situations, and particularly with cement plugs adapted for use in conjunction with a device or instrument suspended in the well on a wire line to indicate the location of the cement slurry in the well.

A general object of this invention is to provide simple, inexpensive and effective cementing plugs of the character mentioned.

Another object of this invention is to provide cementing plugs that may be easily and quickly arranged about a cable or wire line extending into the well.

Another object of this invention is to provide cementing plugs of the character mentioned that provide effective seals about the wire line and with the internal surface of the well casing to prevent the loss and contamination of the plastic cement or cement slurry.

A further object of this invention is to provide cementing plugs of the character mentioned that may be passed downwardly over an instrument on the lower end of a wire line and that permit the upward movement of the wire line and the instrument through them for the purpose of locating the upper surface of the body of cement and for the purpose of removing the instrument from the well.

The various objects and features of our invention will be fully understood from the following detailed description of a typical preferred form and application of our invention, throughout which description reference is made to the accompanying drawings, in which:

F g. 1 is a longitudinal sectional view of a well bore containing a casing illustrating the cementing plugs of the present invention at the upper and lower ends of a body of cement being passed through the casing showing the plugs moving downwardly on a wire line carrying a cement locating instrument. Fig. 2 is a longitudinal sectional view of the lower portion of the well shown in Fig. 1 illustrating the plugs after they have passed downwardly over the instrument. Fig. 3 is an enlarged longitudinal detailed sectional view of the upper plug removed from the well, being a view taken as indicated by line 3—3 on Fig. 2. Fig. 4 is an enlarged longitudinal detailed sectional view of the lower plug removed from the well, being a view taken as indicated by line 4—4 on Fig. 2. Fig. 5 is a view similar to Fig. 3 illustrating the manner of arranging the upper plug on the cable or wire line. Fig. 6 is a plan view of the upper plug, being a view taken substantially as indicated by line 6—6 on Fig. 3. Figs. 7 and 8 are fragmentary horizontal detailed sectional views taken as indicated by lines 7—7 and 8—8, respectively, on Fig. 3, and Fig. 9 is a horizontal sectional view taken as indicated by line 9—9 on Fig. 4.

In the drawings we have illustrated a typical well W in which a casing C is arranged to be cemented in place. The casing C is received in the well W with clearance, leaving an annular space around the casing. In accordance with the usual practice the casing C is suspended from its upper end and is provided at its lower end with a cement shoe S. The shoe S is provided with a vertical passage P for the discharge of the cement into the well. The passage P is controlled by a valve V that prevents the entrance of fluid to the lower end of the casing C and that allows the discharge of the cement from the casing into the well. The shoe S is formed of frangible or drillable material or has its internal parts formed of such material so that it may be drilled through by drilling tools, following the completion of the cementing operation and the setting of the cement. In Fig. 1 of the drawings we have shown a cement head H arranged on the upper end of the casing C to facilitate the pumping of the cement slurry into the well. The head H is such that it may be quickly applied to and removed from the casing C.

We have further illustrated a cable or wire line L extending into the casing C from the upper end of the well. The line L is handled by a reel R that may be considered a measuring reel having means for indicating the depth or position of the lower end of the line or an object thereon. The line L passes from the reel R over a pulley 10 and then passes through a nipple or gland 11 on the upper end of the head H and thus enters the upper end of the casing C. An instrument I is secured to the lower end of the line L and will herein be described as employed to determine the position of a body of cement slurry X when the same has been pumped to the bottom of the casing C. The particular instrument I illustrated may be considered as receptive or responsive to changes in the electrical conductivity of fluid in the casing, and as shown in the drawings, has spaced electrodes 12 at its lower end. The electrodes 12 may be connected in an electrical circuit handled by conductors extending to the ground surface. Suitable instruments 13 are associated in the said circuit at the ground surface for indicating or recording the changes in resistance in the circuit due to differences in the characteristics of the fluid in the field between the two electrodes 12. It is to be understood that the instrument I may be of a type whose electrical capacity is varied by changes in the character of the fluid in the casing to influence a suitable amplifying circuit or that it may be of a type whose inductance is changed by the character of the fluid in the casing to influence a vacuum tube oscillating circuit which, in turn, may be associated with suitable indicating apparatus. The above mentioned types of instruments are fully described and claimed in our co-pending application, Serial No. 170,862.

The line L may be threaded through the gland 11 of the head H preparatory to the cementing operation and the instrument I may be lowered on the line to the lower portion of the casing C. The position of the instrument I in the casing C is indicated by the measuring reel R. In practice the instrument I may be lowered to a point at or adjacent the plane to be occupied by the upper part or surface of the body of cement slurry X when the same is in its final position in the well.

The present invention provides, generally, a lower plug A to separate the lower end of the body of cement slurry X from the fluid F in the well and an upper plug B for separating the upper surface of the body of cement slurry X from the fluid in the well.

The lower plug A of the invention comprises, generally, two slotted tubular sections 14 and 15 adapted to be assembled on the line L, means 16 on the section 14 for sealing about the line L and a washer or cup 17 for sealing with the interior of the casing C to prevent contamination and loss of the cement slurry X.

The sections 14 and 15 of the lower plug A are preferably formed of a material that may be readily broken up or drilled up by well drilling tools when in the well. In practice it may be economical to form the sections 14 and 15 of wood, it being understood that they may be formed of rubber, Bakelite, or similar drillable materials. The sections 14 and 15 are elongate tubular parts proportioned to pass through the casing C with substantial clearance. In practice the lower section 15 is considerably longer than the section 14. The lower portion 18 of the section 15 is preferably enlarged in diameter and has a flat lower surface adapted to seat against the upper end of the shoe S as will be subsequently described. Longitudinal openings 19 and 20 pass longitudinally through the sections 14 and 15, respectively, between their opposite ends. The openings 19 and 20 are sufficiently large in diameter to freely pass or receive the instrument I. A radial slot 21 is provided in the upper plug section 14. The slot 21 extends between the upper and lower ends of the section 14 and extends from the periphery of the section to its opening 19. The slot 21 is sufficiently wide to readily receive the line L. The lower section 15 is provided with a similar radial slot 22 which extends longitudinally between its upper ends and which extends inwardly to join its opening 20.

The sections 14 and 15 are arranged in end to end relation and following their arrangement on the line L may be secured together in any suitable manner to constitute the body of the plug A. In the simple, preferred form of the invention illustrated in the drawings, the sections 14 and 15 are connected by screws 23 passed downwardly through openings 24 in the upper section 14 and threaded or screwed into the section 15. In accordance with the invention the sections 14 and 15 of the plug A are related in such a manner that the plugs cannot become displaced from the line L after they have been assembled about the line. In assembling the plug A on the line L the section 14 is moved laterally toward the line so that its slot 21 receives or passes the line and the section 15 is moved laterally toward the line in a similar manner so that its slot 22 passes or receives the line. In this manner the sections 14 and 15 are brought to positions where the line L extends through their openings 19 and 20. The sections 14 and 15 are then turned with respect to one another to move the slots 20 and 22 out of alignment. For example, the section 14 may be turned with respect to the section 15 to bring its slot 21 to a position 180° from the slot 22.

The openings 19 and 20 register to constitute a single longitudinal passage through the plug A. The lower end of this passage, at the lower end of the opening 20, is adapted to communicate with the upper end of the passage P when the plug A seats in the shoe S. A plurality of circumferentially spaced ports 25 is provided in the section 15. The ports 25 extend inwardly from the periphery of the section 15 to its opening 20 and are adapted to pass cement slurry into the opening 20 and the passage P when the plug A is seated in the shoe S as will be hereinafter described. The ports 25 may slope downwardly and inwardly and may have their mouths or outer ends at the curved or inclined surface where the portion 18 joins the body of the section 15.

The means 16 is provided on the upper plug section 14 to seal about the line L and thus prevent loss and contamination of the cement slurry X. In accordance with the invention the means 16 is such that it does not interfere with the easy and rapid arrangement of the plug section 14 on the line L. The means 16 includes a length or strip 26 of fabric, rubber, leather or a combination of such materials arranged on the upper end of the section 14. The strip 26 is spiralled or wrapped to form a substantially conical element whose apex has an opening 27. The strip 26 arranged or wrapped as just described is positioned on the upper end of the section 14 so that its opening 27 is co-axial with the opening 19. The ends of the strip overlap so that the strip normally constitutes a continuous or unbroken sealing element surrounding the line L and closing the upper end of the opening 19. The overlapping of the ends of the strip 26 preferably occurs in substantially the same vertical plane as the slot 21 of the section 14 so that the end portions of the strip may be pulled back or separated to allow the passage or entrance of the line L into the slot 21 and the opening 19 when the section 14 is arranged on the line, as described above. Following the arrangement of the section 14 on the line L the opposite end portions of the strip 26 are returned to their original positions where they overlap to provide a continuous sealing element. The lower edge portions of the strip 26 may be secured to the section 14 by screws or nails 28. The yielding nature of the strip 26 arranged as just described permits the substantially free relative longitudinal movement by the plug and the line and allows the plug A to move downwardly over the instrument I and allows the instrument I to be drawn upwardly through the plug. It is believed that it will be understood how the strip 26 will expand to receive or pass the instrument I during such relative movement between the instrument and the plug A.

The washer or cup 17 is provided on the plug A to seal with the internal surface of the casing C and thus assists in separating the body of cement slurry X from the fluid F in the well. The cup 17 is in the nature of a disc formed of pliable yielding material such as leather, fabric, rubber or a suitable combination of the same. The cup 17 projects laterally or radially from the periphery of the plug A to have sealing cooperation with the internal surface of the casing C. It is preferred to construct the washer or cup 17 of two or more discs or layers 29. In the preferred construction illustrated in the drawings one layer 29 is secured to the lower end of the section 14 and a second layer 29 is secured to the upper end of the section 15 so that the layers are in face to face relation when the sections are assembled, as described above. The layers 29 may be secured to the plug sections 14 and 15 by nails 30, or the like. Openings 31 are provided in the layers 29 to register with the openings 19 and 20. A radial slot 32 is provided in each disc or layer 29 and extends from its opening 31 to its perimeter. The slot 32 of the layer 29 secured to the section 14 is in alignment with the slot 21 and the slot 32 of the layer on the section 15 is in alignment with its slot 22. From this it will be seen that the layers 29 constituting the washer or cup 17 do not interfere with the easy arrangement of the plug sections 14 and 15 on the line L.

When the sections 14 and 15 are turned to move their slots 21 and 22 out of alignment, as described above, the slots 32 of their respective layers 29 are likewise moved out of alignment so that the two layers 32 form a continuous tight assembly. The layers 29 constituting the cup 17 are proportioned to curve or flare upwardly to form a cup-like assembly when the plug A is introduced into the casing C. This reduction in the diameters of the peripheral portions of the layers 29 causes the parts of the layers at their slots 32 to overlap and assures a more effective sealing action. Fig. 1 of the drawings illustrates the shape of the cup 17 when the plug A is in operation. The washer or cup 17 constructed as described, is adapted to collapse or have its skirt forced downwardly about the section 15 when subjected to a heavy or increased downwardly directed fluid pressure, as will be more fully described.

The upper plug B comprises, generally, an intermediate body section 35, an upper end section 36, a lower end section 37, means 38 on the upper end section 36 for sealing about the line L, and cups or washers 39 for sealing with the interior of the casing C.

The intermediate body section 35 is an elongate tubular member having a central longitudinal opening 40. The section 35 is provided with a lateral or radial slot 41 extending between its opposite ends and communicating with the opening 40. The slot 41 is provided to admit the line L to the opening 40 when the section 35 is arranged on the line. The end body sections 36 and 37 have longitudinal openings 42 and 43, respectively, and radial or lateral slots 44 and 45, respectively. The openings 42 and 43 are adapted to register with the opening 40 of the section 35 and the slots 44 and 45 are adapted to receive the line L to facilitate the arrangement of the sections 36 and 37 on the line L. The plug body sections 35, 36 and 37 may be cylindrical members of the same external diameter and may have flat horizontal opposite ends, as illustrated in the drawings. The three sections 35, 36 and 37 are adapted to be assembled in end to end relation to constitute the body of the plug B. The openings 40, 42 and 43 are sufficiently large in diameter to receive and pass the instrument I.

In accordance with the invention the sections 35 and 36 and 37 are formed of frangible material such as wood, rubber, Bakelite, cement, or the like. In the case illustrated the body sections 35, 36 and 37 are formed of wood. It is believed that it will be apparent how the three body sections 35, 36 and 37 of the plug 13 may be individually arranged on the line L by moving them laterally toward the line so that their respective slots 41, 44 and 45 admit the line to their respective openings 40, 42 and 43. Fig. 5 of the drawings illustrates the manner of arranging the upper section 36 on the line L. Following the arrangement of the sections 35, 36 and 37 on the line L they may be turned with respect to one another to move their slots 41, 44 and 45 out of longitudinal alignment so that the plug B cannot be dissociated from the line.

Means is provided for connecting the three sections 35, 36 and 37 after they have been assembled on the line L as described above. If desired, the body sections of the plug B may be secured together by nails and screws in the same manner as the body sections of the plug A. In the drawings we have shown another manner of connecting the sections 35, 36 and 37, which comprises rods or bolts 47 arranged through longitudinal openings 48 in the assembled sections 35, 36 and 37. The bolts 47 each have a head at one end and a nut 49 is threaded on the other end. The bolt heads and the nuts 49 may be recessed in the exposed ends of the upper and lower body sections 36 and 37. It will be understood that the openings 48 are located in such a manner that the slots 41, 45 and 44 are out of registration or alignment when the said openings are aligned for the reception of the bolts 47. The bolts 47 are preferably formed of aluminum or a similar material that is drillable or readily broken up by well drilling tools.

The means 38 is provided on the upper end of the plug B to slidably seal about the line L. In practice the means 38 may be similar to the means 16 described above. The means 38 may comprise a strip 26ª of fabric, leather, rubber, or a combination of such materials. The strip 26ª is spiralled or wrapped into the form of a cone having its base resting on the upper end of the section 36 and having an opening 27ª in its upper end slidably passing the line L. The opposite ends of the strip 26ª are lapped, the lapped portions of the strip being in substantially the same vertical plane as the slot 44. Because of this relationship the means 38 does not interfere with the easy arrangement of the section 36 on the line L. Screws or nails 50 may secure the lower edge portion of the strip 26ª to the body section 36. If desired the strip 26ª may be secured to the section 36 prior to the arrangement of the section on the line L. In this event the end portions of the strip 26ª are separated so that the line may be readily received in the slot 44 and following the reception of the line in the opening 42 the overlapped portions are returned to their original state.

The cups or washers 39 are provided on the plug B to seal with the interior of the casing C to exclude the fluid F from the body of plastic cement X between the plugs A and B. It is preferred to provide a washer 39 at the upper and lower ends of the intermediate section 35. The washers 39 may be similar to the above described cup 17 and have their inner portions clamped or held between the ends of the intermediate section 35 and the opposing ends of the end sections 36 and 37. Each washer 39 includes a disc shaped layer 52 of leather, fabric, rubber, or similar material secured to an end of the section 35. The layers 52 may be secured to the ends of the section 35 by nails 53 or other suitable means. The layers 52 have cuts or slots 54 registering with the slot 41 in the section 35. The upper washer 39 includes a disc shaped layer 55 of fabric, leather, rubber, or the like, secured to the lower end of the section 36. The layer 55 has a slot or cut 56 registering with the slot 44. The layer 55 may be secured to the section 36 by nails 57 or similar means. The lower washer 39 includes a disc shaped layer 58 of leather, rubber, fabric, or the like, secured to the upper end of the section 37 by nails 59, or similar means. The layer 58 has a cut or slot 60 registering with the slot 45 in the section 37. The layers 52, 55 and 58 have central openings registering with the openings 40, 42 and 43.

The slots 54 in the layers 52 permit the quick arrangement of the section 35 on the line L, the slot 56 provides for the easy arrangement of the section 36 on the line L and the slot 60 is adapted to pass the line L to provide for the easy arrangement of the section 37 on the line. When the plug body sections 35, 36 and 37 are assembled on the line L, as described above, the layer 55 rests down against the upper layer 52 and the layer 58 rests up against the lower layer 52. It will be observed that the slots 54 in the layers 52 are out of alignment with the slots 56 and 60 when the sections 35, 36 and 37 are secured together by the bolts 47.

The washers 39 just described may be stiffer and less yielding than the above described cup 17 to more effectively resist the pump pressure applied to the fluid F above the plug B to force the body of cement slurry X down through the casing C. While we have shown the washers 39 proportioned to assume the shape of cups when the plug B is inserted in the casing C it is to be understood that the washers may be proportioned to have their peripheral edges slidably cooperate with the interior of the casing C in which case the washers are preferably quite stiff to remain substantially horizontal when the required pump pressure is placed on the fluid F above the plug.

In the use or operation of the apparatus the instrument I is secured to the lower end of the line L and the line L is run into the casing C. The instrument I may be lowered to a point adjacent or above the position to be occupied by the upper plug B when the cement C has been forced to the desired position in the well. The reel R indicates the position of the instrument I in the well. The head H may be readily removed from the upper end of the casing C to permit the insertion of the lower plug A in the casing. The lower plug A may be quickly assembled about the line L for insertion in the casing by individually moving the sections 14 and 15 laterally toward the line so that the line is received in their slots 21 and 22, respectively, and then received in their openings 19 and 20, respectively. The sections are then connected by the screws 23 and the plug is entered in the casing. The head H is then reconnected with the casing C and the required amount of cement slurry is pumped into the head to enter the casing and form a stratum above the plug A. The head H is then removed from the casing C and the upper plug B is assembled about the line L and introduced in the casing C. It will be understood how the slotted apertured plug sections 35, 36 and 37 may be quickly assembled about the line L and connected by the bolts 47 to form the plug assembly best illustrated in Figs. 1, 2 and 3 of the drawings. The head H may then be reapplied to the casing C and water or other fluid pumped into the casing under pressure to force the body of cement slurry X down through the casing.

The plug A with its washer or cup 17 effectively separates the lower end of the body of cement slurry X from the fluid F in the well and the plug B with its washers 39 effectively separates the cement slurry from the pumped fluid. The cup 17 and the washers 39 slidably seal with the interior of the casing C while the means 16 and 38 slidably seal with the line L as the plugs A and B move down through the casing with the cement slurry X.

The reading on the instruments 13 is observed and when the lower plug A passes down over the instrument I, the field between the electrodes 12 is occupied by the cement slurry X. The means 16 is such that it readily passes down over the instrument I. Immediately upon the movement of the cement slurry X down about the electrodes 12 the readings on the instruments 13 are changed indicating to the operator that the cement slurry has reached the instrument I. The downward movement of the cement slurry X may continue until the lower end of the plug A seats on the shoe S to bring the opening 20 in register with the passage P. The pump pressure applied to the cement slurry X through the fluid F above the plug B results in the downward flexing or collapse of the cup 17 so that the cement slurry X passes down about the plug A through the ports 25, the opening 20 and the passage P to enter the well W and flow up in the space about the casing C. Downward movement of the upper plug B may continue until the plug passes down over the instrument I and the cement slurry X completely passes the instrument. When this occurs the field between the electrodes 12 is replaced by the fluid F above the plug B and the reading of the instruments 13 is again changed indicating to the operator that the cement slurry X has reached the desired position in the well.

Having described only a typical preferred form and application of our invention, we do not wish to be limited or restricted to the specific details herein set forth, but wish to reserve to ourselves any variations or modifications that may appear to those skilled in the art or fall within the scope of the following claims.

Having described our invention, we claim:

1. A cementing plug for use in association with a line comprising a plurality of plug body sections each having a longitudinal opening and a lateral slot joining the opening and adapted to receive the line whereby the sections may be assembled about the line with their openings receiving the line, and means for connecting the sections when thus assembled about the line.

2. Well cementing apparatus comprising a line to be lowered in the casing of the well, and a cementing plug to be passed down the casing, the line and plug being related for relative movement, the plug comprising a plurality of plug body sections each having a longitudinal opening for receiving the line and a lateral slot for admitting the line to the opening whereby the section may be assembled about the line for insertion in the casing, means for connecting the sections when thus assembled, and means on the assembled sections for slidably sealing with the interior of the casing.

3. Apparatus useful in cementing a casing in a well comprising an instrument sensitive to the character of the fluid in the casing, a line for suspending the instrument in the casing, and a plug adapted to move down in the casing with a body of plastic cement, the plug comprising plug body sections to be assembled about the line, there being an opening through the sections for receiving the line and adapted to pass the instrument, and means on the sections for sealing with the interior of the casing to separate the cement from the fluid in the well.

4. Apparatus useful in cementing a casing in a well comprising an instrument sensitive to the character of the fluid in the casing, a line for suspending the instrument in the casing, and a plug adapted to move down in the casing with a body of plastic cement, the plug comprising plug body sections to be assembled about the line, there being an opening through the sections for receiving the line and adapted to pass the instrument, means on one of the sections for slidably sealing with the line and yieldable to pass the instrument, and means on the sections for sealing with the interior of the casing to separate the cement from the fluid in the well.

5. Apparatus useful in cementing a casing in a well comprising an instrument sensitive to the character of the fluid in the casing, a line for suspending the instrument in the casing, and plugs for moving down in the casing at the ends of a body of plastic cement to separate the same from the fluid in the well, the plugs comprising sections to be assembled about the line and having openings receiving the line and adapted to pass the instrument, and means on the plugs for slidably sealing with the interior of the casing.

6. A cementing plug for use in a well casing in which a line is suspended, the plug comprising sections to be arranged about the line, each section having a longitudinal opening for passing the line and a slot for admitting the line to the opening, means for connecting the sections to have their slots out of longitudinal alignment, and means on the assembly of said sections for slidably sealing with the interior of the casing.

7. A cementing plug for use in a well casing in which a line is suspended, the plug comprising sections to be arranged about the line in end to end relation, each section having an opening for receiving the line and a lateral slot for admitting the line to the opening, means connecting the sections so that their said slots are out of alignment, and a washer held between the ends of the connected sections and adapted to slidably seal with the interior of the casing.

8. A cementing plug for use in a well casing in which a line is suspended, the plug comprising sections to be arranged about the line in end to end relation, each section having an opening for receiving the line and a lateral slot for admitting the line to the opening, means connecting the sections so that their said slots are out of alignment, means on one of the sections for sealing with the line and having portions overlapping at the slot in said section adapted to be moved out of the overlapping relation to admit the line to said slot, and a washer held between the ends of the connected sections and adapted to slidably seal with the interior of the casing.

9. A cementing plug for use in a well casing in which a line is suspended, the plug comprising sections to be arranged about the line in end to end relation, each section having an opening for receiving the line and a lateral slot for admitting the line to the opening, means connecting the sections so that their said slots are out of alignment, and a washer held between the ends of the connected sections and adapted to slidably seal with the interior of the casing, said washer comprising a layer attached to an end of each section and having a split substantially aligned with the slot in its respective section to admit the line.

10. A cementing plug for use in a well casing in which a line is suspended, the plug comprising a plurality of sections to be assembled about the line in end to end relation to form the body of the plug, each section having a longitudinal opening for passing the line and a lateral slot for admitting the line to the opening, means connecting the sections together with the slots out of longitudinal alignment, and washers held between the opposing ends of the sections and projecting outwardly to seal with the interior of the casing, the washers including layers secured to the ends of the sections and having radial slits registering with the slots in the sections to which they are secured.

11. A cementing plug for use in a well casing in which a line is suspended, the plug comprising a plurality of sections to be assembled about the line in end to end relation to form the body of the plug, each section having a longitudinal opening for passing the line and a lateral slot for admitting the line to the opening, means connecting the sections together with the slots out of longitudinal alignment, a flexible strip secured to the uppermost section and wrapped about the line to slidably seal with the same, and washers held between the opposing ends of the sections and projecting outwardly to seal with the interior of the casing, the washers including layers secured to the ends of the sections and having radial slits registering with the slots in the sections to which they are secured.

ARTHUR L. ARMENTROUT.
RAY W. GUDIE.